Dec. 11, 1934.  A. M. WILHELM  1,984,168
WIND T LOCATOR
Filed Feb. 27, 1931
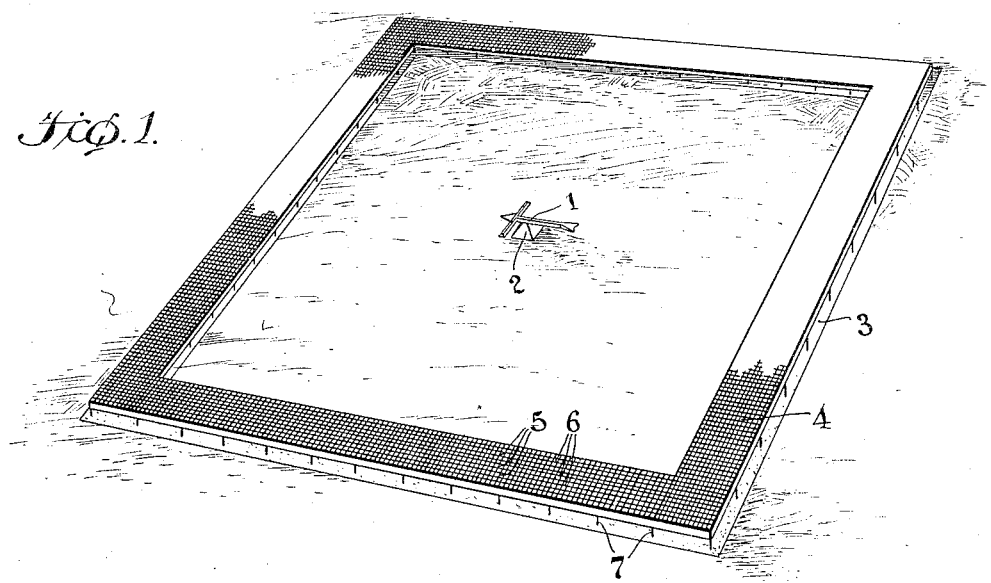
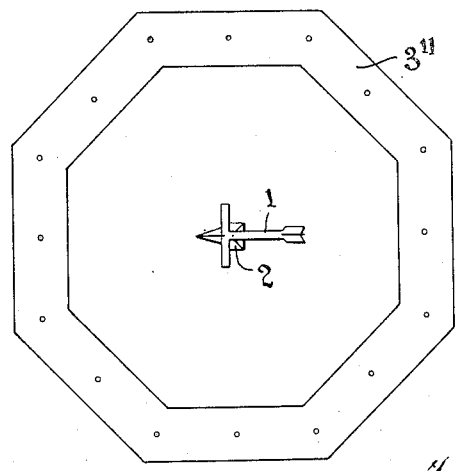
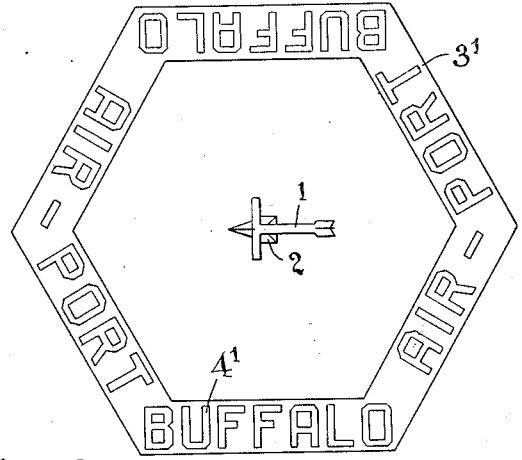
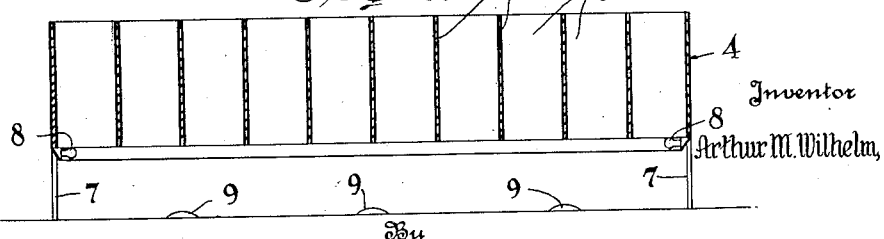
Inventor
Arthur M. Wilhelm,
By
Bean, Brooks & Henry Attorneys Patented Dec. 11, 1934

1,984,168

UNITED STATES PATENT OFFICE 1,984,168

WIND T LOCATOR

Arthur M. Wilhelm, Randolph, N. Y.

Application February 27, 1931, Serial No. 518,846

5 Claims. (Cl. 40—130)

This invention relates to means for facilitating the location or finding of a wind T or indicator from the air.

Indicators now in use for indicating to the aviator the direction of the wind at which it may be blowing across the landing field are of various designs, such as socks or tubes and pivotally mounted Ts. Such indicators tend toward safety in bringing the ship down to the ground, it being most desirable to land the ship "into the wind". When flying over the field at various altitudes it is difficult to locate or find the wind indicator and especially is this true where the indicators are of small size, or when the aviator is at quite a high elevation above the field.

The present invention provides means to facilitate the ready location and finding of the wind T, aviation marker or other indicator from the air and thereby avoid prolonged distraction of the aviator's attention from his control of the ship.

In the drawing:—

Fig. 1 is a perspective view of a landing field as viewed from the air and showing the present invention;

Fig. 2 is a cross sectional view through a fragment thereof; and

Figs. 3 and 4 are top plan views depicting the present invention in other configurations.

In proceeding in accordance with the present invention readily visible means are provided to frame the T in a manner quickly to catch the eye of an aviator when aloft, and at a glance point out to him the location of the wind indicator from which he may determine the direction from which the wind is blowing.

Referring more particularly to the drawing wherein is depicted the preferred embodiment of my invention, the numeral 1 designates a wind T or indicator mounted upon a base 2 for wind-responsive action by which the aviator is apprised of the direction from which the wind is blowing and thereby is enabled to determine the proper manipulation of the ship for a safe landing. The field portion immediately about the T 1 is enclosed by a framing band 3 of substantial width and which may be of concrete or other material possessing a shade or color readily distinguishable from that of the surrounding field. The band is thereby readily discernible from the air and may be raised above the ground level to be more easily kept clean. This band may be continuous about the T, or it may be in sections or segments arranged to give the general appearance from the air of an encircling frame or border for that portion of the field adjacent the T. This framing band or border is preferably of a character which may not readily be covered and concealed by snow and to this end it is preferred to face the border with a facing or delineation which will extend above a blanket of snow and be free thereof.

The particular facing herein depicted comprises an open mesh or foraminous body 4 and may be fabricated by rows of intersecting plates 5 and 6 arranged on edge to provide open tubes or passages which open through both the top and bottom faces of the frame facing 4 for the ready passage of snow therethrough. In practice these openings are of a size to prevent clogging of the same and as an example may be rectangular in shape and one or two feet square. The plates are of substantial depth sufficient to present an apparent solid wall appearance without holes therein when viewed from the air at an angle of 45° to the perpendicular. The facing is supported above the band 3, as by legs 7, a distance substantially equal to the cross sectional dimension of the individual mesh openings, or a distance sufficient to permit the ready exit of snow from beneath the facing and from off the band.

For night use the facing is illuminated. This illumination may be accomplished by means of lights 8 and 9 disposed preferably between the band 3 and the facing 4 to cast their rays upwardly upon the side faces of the plates 5 and 6 without annoying glare sufficient to obscure the T 1, which, of course, is also illuminated in the customary manner. Consequently for night use the mesh facing produces a reflected or indirect light to view from the air and gives the effect of a subdued illumination for the border or frame about the more brilliantly illuminated T.

The framing or locating band may assume proportions of one or two hundred feet on a side, and most preferably of sufficient expanse to freely clear any extending portions of the T with ample space between the latter and its frame so that the T will be readily discernible from the air. The frame will distinctly set off the wind T from the hangars and other structures about an airport and will quickly attract the eye.

In Fig. 1 the framing is depicted as being rectangular; in Fig. 3 it is illustrated as being hexagonal, as indicated at 3'; and in Fig. 4 is shown as octagonal in shape, as indicated at 3''; but it may obviously be of other configuration. The open mesh facing may be coextensive with the band, as illustrated in Fig. 1, or the band may be in the form of lettering, such as is indicated at 4' in Fig. 3, or other designs, the lettering being so arranged as to provide in effect a border substantially encircling the T. If the facing 4' is in the form of lettering it is desirable to utilize the same for designating the name of the airport. The tubes defined by the plates 5 and 6 may obviously be disposed at an angle to the vertical, or they may have their lower portions offset, to increase more or less wall surface to view from the air, and when viewed at a greater or lesser angle than 45°, without departing from the spirit of my invention.

The term "indicator" or T is used herein in a broad sense and to include other forms of signalling means or devices by which information may be conveyed to the flying aviator, the eye of the aviator being quickly attracted and directed by the frame to concentrate upon the specific area enclosed thereby, and to the device or information enclosed therein.

What is claimed is:

1. An aviation marker comprising an open frame in the form of a framing band and a facing for the band having openings opening through the top and bottom faces of the facing for the ready passage therethrough of snow and the like, and means for spacing the facing above the band for the escape of matter, which passes through the mesh openings, from beneath the facing and clear of the framing band.

2. An aviation marker comprising a ground frame of substantially endless formation, a facing for the band, means for spacing the facing above the band, and means for illuminating the facing, said means being disposed between the facing and the band and said facing being pervious to light.

3. Means for locating an indicating device, comprising a framing band for substantially encircling such device, a facing for the band of open mesh work for the ready passage therethrough of snow and the like, said facing comprising plural rows of intersecting plates, said plates extending substantially for the thickness of the facing and providing upright mesh openings open at their top and bottom ends, and means for illuminating the walls of the mesh openings.

4. A framing band for aviation markers, and the like, comprising a body substantially encircling such marker and having a top facing of open mesh-work for passing falling matter therethrough, and illuminating means for the body concealed beneath such top facing and illuminating the mesh-work walls for providing an indirect and subdued illumination of the band, said mesh-work facing being separate from and spaced outwardly about the marker to present a distinct and self-clearing frame thereabout.

5. Means for locating an indicating device comprising a framing body substantially encircling such device and spaced outwardly therefrom so as to clearly mark and emphasize the device, said framing body being elevated above the ground and having its top surface spaced from the ground throughout, such top surface being foraminous for passing falling matter therethrough, whereby such framing body will have its top surface maintained substantially free and clear of obscurely falling matter.

ARTHUR M. WILHELM.